United States Patent
Li et al.

(10) Patent No.: US 8,208,018 B2
(45) Date of Patent: Jun. 26, 2012

(54) METHOD FOR MEASURING BRIGHTNESS UNIFORMITY OF A PANEL

(75) Inventors: Zheng-yang Li, Suzhou (CN);
Ming-rong Chen, Suzhou (CN)

(73) Assignees: AU Optronics (SUZHOU) Corp,
Suzhou (CN); AU Optronics Corp,
Hsin-Chu (TW)

( * ) Notice: Subject to any disclaimer, the term of this patent is extended or adjusted under 35 U.S.C. 154(b) by 1098 days.

(21) Appl. No.: 12/108,693

(22) Filed: Apr. 24, 2008

(65) Prior Publication Data

US 2009/0051907 A1 Feb. 26, 2009

(30) Foreign Application Priority Data

Aug. 21, 2007 (CN) .......................... 2007 1 0141775

(51) Int. Cl.
*H04N 7/18* (2006.01)

(52) U.S. Cl. .......... 348/131; 348/88; 348/127; 348/132; 375/240.24

(58) Field of Classification Search .......... 348/131–132, 348/88, 127; 375/240.24
See application file for complete search history.

(56) References Cited

U.S. PATENT DOCUMENTS

| | | | |
|---|---|---|---|
| 6,219,099 B1 | 4/2001 | Johnson et al. | |
| 6,940,557 B2 | 9/2005 | Handjojo et al. | |
| 7,719,512 B2 * | 5/2010 | Kwon | 345/102 |
| 2001/0028358 A1 * | 10/2001 | Tanizawa | 345/660 |
| 2004/0125106 A1 * | 7/2004 | Chen | 345/426 |
| 2006/0182180 A1 * | 8/2006 | Araya et al. | 375/240.24 |
| 2006/0221326 A1 | 10/2006 | Cok et al. | |
| 2006/0274158 A1 * | 12/2006 | Tatsumi et al. | 348/222.1 |
| 2007/0030697 A1 * | 2/2007 | Kim | 362/618 |
| 2007/0092002 A1 * | 4/2007 | Xue et al. | 375/240.03 |
| 2007/0248282 A1 * | 10/2007 | Suzuki | 382/282 |
| 2008/0042927 A1 * | 2/2008 | Jung et al. | 345/39 |
| 2009/0073275 A1 * | 3/2009 | Awazu | 348/222.1 |

FOREIGN PATENT DOCUMENTS

| | | |
|---|---|---|
| JP | 2001307637 | 11/2001 |
| TW | 200610424 A | 3/2006 |
| TW | 200622219 A | 7/2006 |
| TW | I274973 B | 3/2007 |

* cited by examiner

*Primary Examiner* — Duyen Doan
(74) *Attorney, Agent, or Firm* — Kirton McConkie; Evan R. Witt

(57) ABSTRACT

A method for measuring brightness uniformity of a panel is disclosed. The method includes steps of: dividing the panel into a plurality of areas, measuring brightness of each area, calculating each area of an average value K the brightness differences between the area and the other adjacent areas, and comparing the value K with a predetermined value. When the value K is greater than the predetermined value, it indicates that the brightness difference between the area and the adjacent areas exceeds a uniformity threshold. When the value K is smaller than the predetermined value, it indicates that the brightness difference between the area and the adjacent areas is below the uniformity threshold. The entire panel is evaluated to ensure accuracy of measuring results.

16 Claims, 5 Drawing Sheets

METHOD FOR MEASURING BRIGHTNESS UNIFORMITY OF A PANEL

TECHNICAL FIELD OF THE INVENTION

The present invention relates to a method for measuring brightness, and more particularly, to a method for measuring brightness uniformity of a light panel.

BACKGROUND OF THE INVENTION

A display device having a light panel such as a liquid crystal display (LCD) panel, brightness of the entire panel should be as uniform as possible. When a backlight is serving as a light source for an LCD panel and the emitted light is non-uniform, frames displayed by the LCD panel will be in a situation of brightness non-uniformity and therefore affecting the user's visual perception.

Conventional methods for measuring brightness uniformity of a panel abide the standard established by the Video Electronics Standards Association (VESA). Brightness uniformity of the entire panel is evaluated as shown in FIGS. 1 and 2 by measuring brightness of 9 points, L1~L9, or 13 points, L1~L13, located on the panel. Then, the proportion of the minor to the maximum is calculated so as to obtain brightness uniformity of the panel. However, this evaluation method has the following disadvantages. When only measuring the 9 points or the 13 points of the entire panel, it is probable that brightness of the 9 points or the 13 points is uniform but brightness of the other areas is inconsistent with brightness of those points. By only measuring the 9 points or the 13 points of the entire panel to get a conclusion, saying that brightness of the entire panel is uniform, the conclusion is only a statistical probability and errors may exist. For example, brightness of the 9 points or the 13 points may be adjusted to be uniform, but actually, brightness of the other areas of the entire panel may not necessarily be consistent with brightness of the 9 points or the 13 points. Therefore, by the conventional method of evaluation, brightness of some specific positions of the panel is uniform, while brightness of the entire panel may actually be non-uniform.

The conclusion of the conventional measuring method can be further examined by human eyes. Since judgment of human eyes is subjective, it may result in different judgments due to different observers in different environments. For example, brightness of the 9 points or the 13 points may be uniform, but brightness of the other points may be inconsistent with brightness of the 9 points or the 13 points. When brightness of the entire panel is highly bright, it will be considered as uniform by human eyes due to poor sensibility of human eyes to higher brightness of light. At that time, brightness of the entire panel may actually be non-uniform. By utilizing the conventional measuring method, an unqualified product having non-uniform brightness may be marketed as a result. Because the conventional method for examining brightness of the panel has the aforesaid disadvantages, it is necessary to provide a method to overcome and improve the aforesaid disadvantages of the conventional technique.

SUMMERY OF THE INVENTION

An objective of the present invention is to provide a method for measuring brightness uniformity of a panel, which is capable of ensuring accuracy of measuring results of brightness.

According to the above objective, the present invention provides a method for measuring brightness uniformity of a panel. The method comprises the steps of: dividing the entire display area of the panel into a plurality of areas, measuring brightness of each area, calculating a value K for each area, where the value K is an average of brightness differences between the area and the other adjacent areas, and comparing the value K with a predetermined value. When the value K is greater than the predetermined value, it indicates that the brightness difference between the area and the adjacent areas exceeds a uniformity threshold. When the value K is smaller than the predetermined value, it indicates that the brightness difference between the area and the adjacent areas is below the uniformity threshold.

According to the measuring method of the present invention, the aforesaid display area is equally divided into a plurality of areas. The areas are the same size and are arranged in a matrix.

According to the measuring method of the present invention, the value K is represented by the following equation:

$$K = \frac{\sum_n [|L_k - L_n|/L_n] + \sum_m [|L_k - L_m|/\sqrt{2}\, L_m]}{m+n},$$

where $L_k$ is brightness of the area, $L_n$ is brightness of the adjacent areas which are perpendicular or parallel to the area, $L_m$ is brightness of the adjacent areas which are diagonal with the area, n is the number of the adjacent areas which are perpendicular or parallel to the area, and m is the number of the adjacent areas which are diagonal with the area.

The method of the present invention for measuring brightness uniformity of a panel comprises measuring all points of the panel. Therefore, it can be more accurate to represent actual brightness uniformity of the panel.

DETAILED DESCRIPTION OF THE INVENTION

To find a just noticeable difference (JND) of perception in a stimulus according to Weber's law, the proportion of a required variant quantity of stimulus to an original quantity of stimulus is a constant. The just difference of perception is called a just noticeable difference, as represented by: JND=kI or k=ΔI/I, where k is a constant, ΔI, i.e. JND, is a just variant quantity of stimulus which causes a difference of perception, and I is intensity or a quantity of a stimulus.

According to the principle of Weber's law, the present invention provides a method to determine brightness uniformity of a panel, which comprises the steps of dividing the entire display area of the panel into a plurality of areas, and calculating an average ratio (value K) of brightness difference between the area and the adjacent areas (the aforesaid variant quantity of stimulus) to brightness of the adjacent areas (the aforesaid original quantity of stimulus). Then, the value K is compared with a predetermined value (i.e. a just noticeable difference value, JND value). When the value K is smaller than the JND value, observers cannot identify brightness difference between two areas and therefore consider that brightness of the two areas as being uniform. When the value K is greater than the JND value, observers can identify brightness difference between two areas and therefore consider that brightness of the two areas as being non-uniform.

The measuring method according to the present invention will be described in detail in conjunction with an example of measuring brightness uniformity of a liquid crystal display (LCD) panel.

Figure 1:
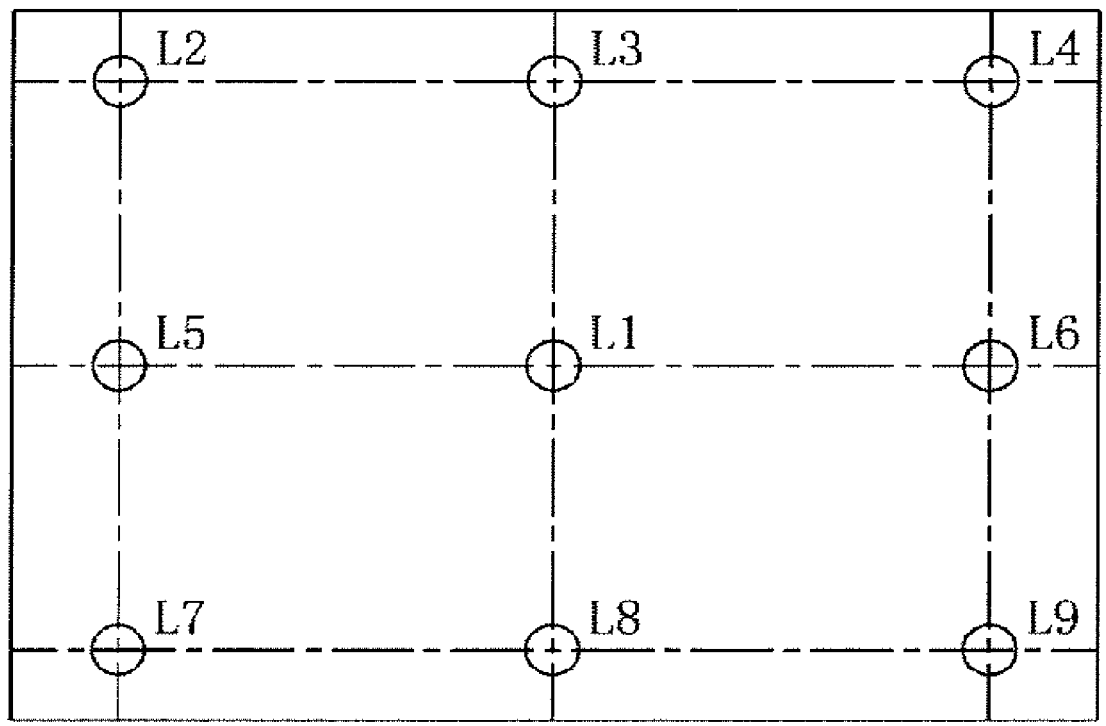
FIG. 1 is a diagram schematically showing a conventional method for measuring a light panel.
Figure 2:
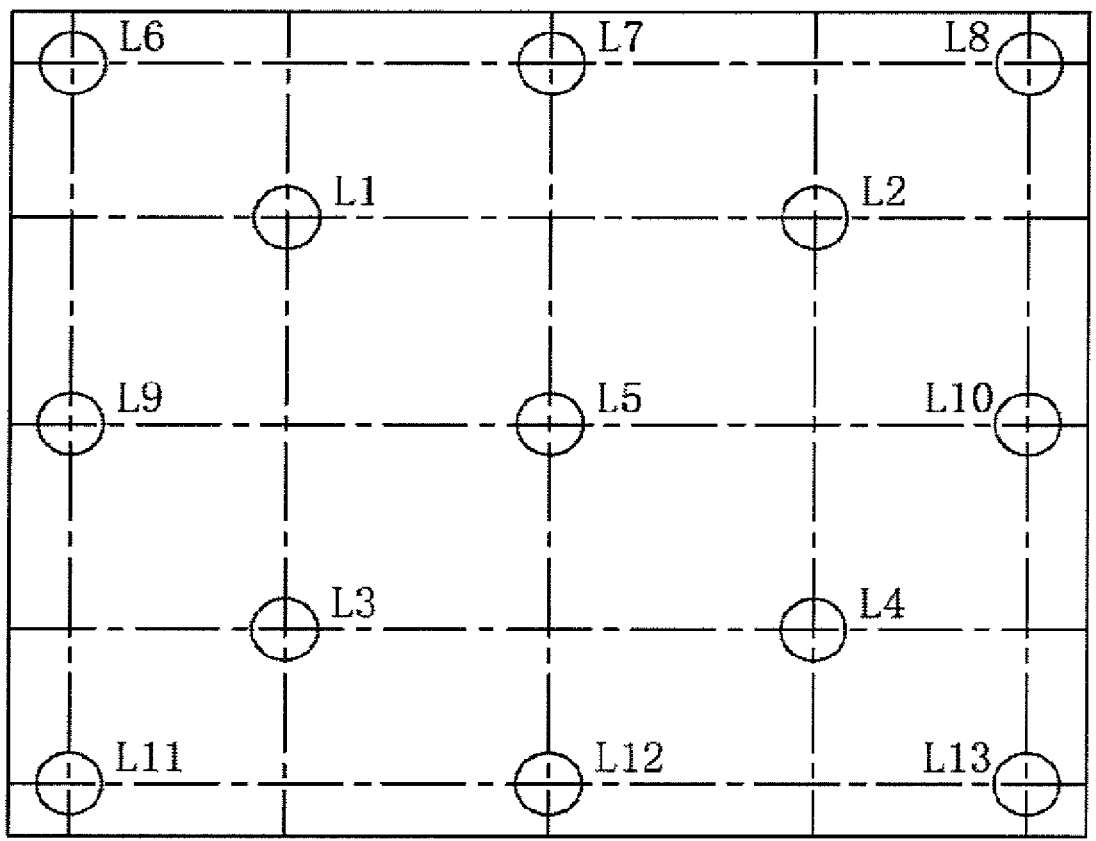
FIG. 2 is a diagram schematically showing another conventional method for measuring a light panel.
Figure 3:
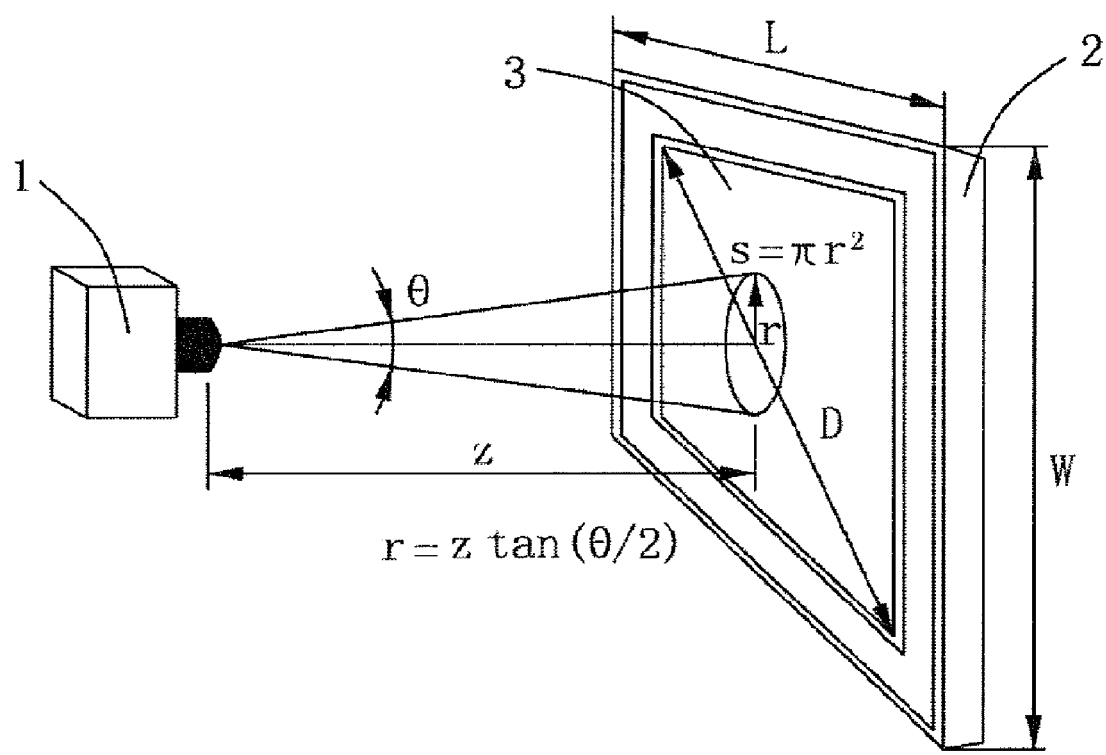
FIG. 3 is a diagram schematically showing an embodiment of the present invention for measuring brightness of each area of a light panel.
Figure 4:
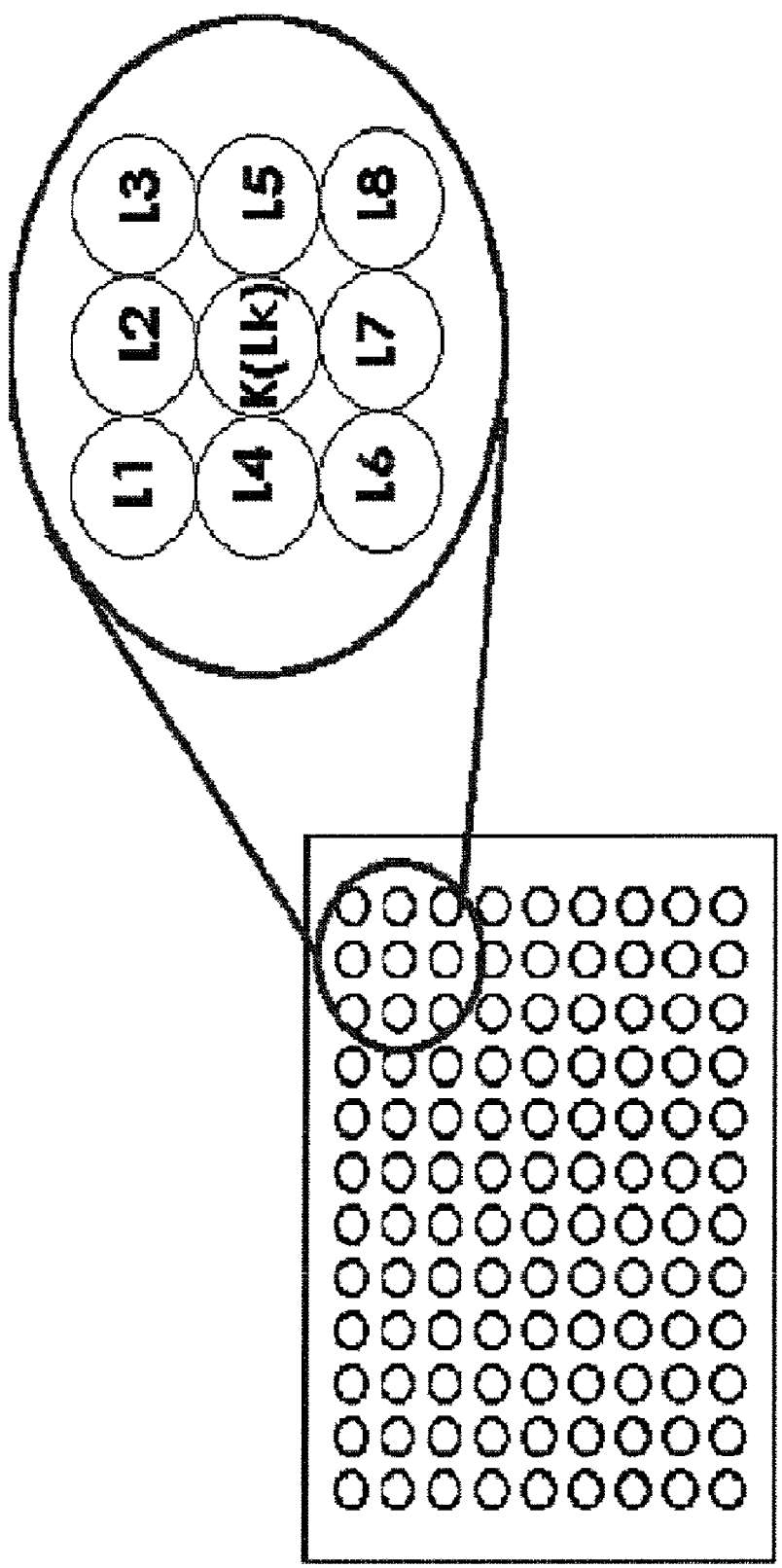
FIG. 4 is a diagram schematically showing an embodiment of the present invention for calculating brightness differences between the area and the adjacent areas.

As shown in FIGS. 3 and 4, a display panel is divided into a plurality of areas and brightness of each area is measured at the beginning. While measuring brightness, a measuring instrument may be used to measure brightness of the areas one by one. A charge-coupled device (CCD) may also be used to measure brightness of all areas of the entire panel at the same time. Moreover, the areas also can be divided into a plurality of blocks, where each block comprises plural areas. It is also workable that measuring brightness of all areas of at least one block at the same time and then measuring brightness of all the blocks one by one until all the areas of the entire panel are measured.

A method of point-by-point measurement with a measuring instrument means that the measurement is taken by measuring brightness of the areas of the entire panel one by one with the measuring instrument. By adjusting a measuring distance and/or a vision angle, the number of measured areas depends on the length and width of the panel and required precision. As measuring the entire panel with a CCD, the number of measured areas depends on the precision of CCD. As follows with an example of the method of point-by-point measurement, it will be described how to measure brightness of each area of the panel. As shown in FIG. 3, a measuring instrument 1 is disposed at a distance Z from a frame 3 of an LCD panel 2. The measuring instrument 1 receives lights from the panel 2 at a vision angle θ. Each area measured by the measuring instrument 1 is a circular area, and a radius r of each measured area is $r = z \tan(\theta/2)$. The number of the plural areas is $(L/2r)*(W/2r)$, where L is the length of the panel 2 and W is the width of the panel 2. For an LCD panel with its length L, 412 mm, and width W, 310 mm, generally the distance between the measuring instrument 1 and the frame 3 is 50 cm, and the vision angle θ is one degree. The diameter of each measured area is 8 mm and the total number of measured areas approaches 2000 areas, where the number in length (L) direction is $412/8 \approx 51$, and the number in width (W) direction is $310/8 \approx 39$.

As shown in FIG. 4, all measured areas are arranged in a matrix. For an area k with measured brightness $L_k$, the adjacent areas perpendicular or parallel to the area are 2, 4, 5, 7, brightness of which are $L_2$, $L_4$, $L_5$, $L_7$, respectively, and the adjacent areas diagonal with the area are 1, 3, 6, 8, brightness of which are $L_1$, $L_3$, $L_6$, $L_8$, respectively.

An average value K of brightness differences between the area k and the adjacent areas 1-8 is calculated. The adjacent areas 1-8 comprise the adjacent areas 2, 4, 5, 7 perpendicular or parallel to the area. The adjacent areas 2, 4, 5, 7 directly adjoin the area as well. The average value of brightness differences between the area k and the adjacent areas 2, 4, 5, 7 is $$K = \frac{|L_k - L_2|/L_2 + |L_k - L_4|/L_4 + |L_k - L_5|/L_5 + |L_k - L_7|/L_7}{4}.$$

The distance between the area k and the adjacent areas 1, 3, 6, 8 diagonal with the area k to the distance between the area k and the adjacent areas 2, 4, 5, 7 perpendicular or parallel to the area k is $\sqrt{2:1}$. The average value of brightness differences between the area k and the adjacent areas 1, 3, 6, 8 is $$K = \frac{|L_k - L_1|/\sqrt{2}L_1 + |L_k - L_3|/\sqrt{2}L_3 + |L_k - L_6|/\sqrt{2}L_6 + |L_k - L_8|/\sqrt{2}L_8}{4}.$$

The average value of brightness differences between the area k and all the adjacent areas is $$K = \left( \frac{|L_k - L_2|/L_2 + |L_k - L_4|/L_4 + |L_k - L_5|/L_5 + |L_k - L_7|/L_7}{4} + \frac{|L_k - L_1|/\sqrt{2}L_1 + |L_k - L_3|/\sqrt{2}L_3 + |L_k - L_6|/\sqrt{2}L_6 + |L_k - L_8|/\sqrt{2}L_8}{4} \right)/2.$$

It concludes that $$K = \frac{\sum_n [|L_k - L_n|/L_n] + \sum_m [|L_k - L_m|/\sqrt{2}L_m]}{m+n},$$

where $L_k$ is brightness of the area k, $L_n$ is brightness of the adjacent areas which are perpendicular or parallel to the area, $L_m$ is brightness of the adjacent areas which are diagonal with the area, n is the number of the adjacent areas which are perpendicular or parallel to the area, and m is the number of the adjacent areas which are diagonal with the area.

Then, the calculated value K is compared with a predetermined value. For example, the predetermined value is a uniformity threshold value 0.013 experienced with human eyes to identify brightness difference by the inventor of the present invention. When the value K is smaller than 0.013, brightness difference between the area and the adjacent areas is beyond the noticeable scope of human eyes. That is, brightness of the area and the adjacent areas is more uniform. When the value K is higher than 0.013, brightness difference between the area and the adjacent areas is within the noticeable scope of human eyes. That is brightness of the area and the adjacent areas is non-uniform.

The uniformity threshold value 0.013 to identify brightness difference with human eyes is merely a threshold, but actually the predetermined value may float while calculating. The uniformity threshold value may be preferred within a range of 0.013-0.017.

Figure 5:
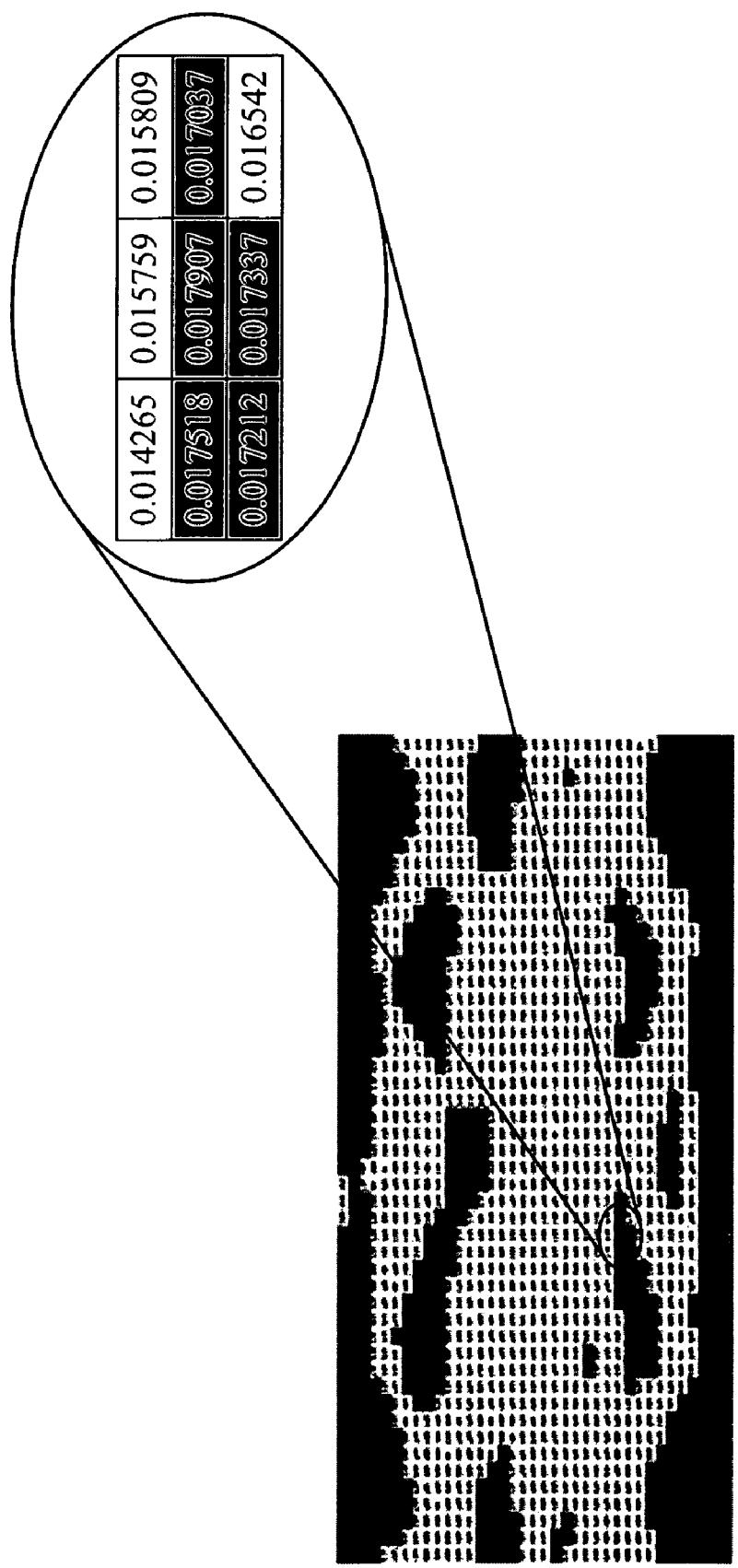
FIG. 5 is a diagram schematically showing measured results of a light panel according to the present invention.

As shown in FIG. 5, a chart is made according to each value K of the areas of the measured panel. The areas of which the value K is higher than 0.017 are marked with shadow. Compare to results observed with human eyes so as to examine whether the measured brightness uniformity is consistent with the observed results. It may also be adjusted the brightness differences of the areas with the value K higher than 0.017 according to the chart.

In the above embodiments, when dividing the display panel into the plurality of areas, the display panel is divided into plural circular areas. In other embodiments, the display panel may also be divided into plural rectangle areas, or other shapes.

In addition, the steps of calculating the value K of each area and making the chart with the calculated results may be automatically excused by a computer program.

Furthermore, the above embodiments are described with measuring brightness uniformity of an LCD panel. The measuring method of the present invention may also be used to measure brightness uniformity of an LCD backlight panel.

While the preferred embodiment of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A method for measuring brightness uniformity of a panel, the method comprising the steps of:

dividing the panel into a plurality of areas;
   measuring brightness of each area;
   calculating a value K for each area, where the value K is represented by:

$$K = \frac{\sum_n [|L_k - L_n|/L_n] + \sum_m [|L_k - L_m|/\sqrt{2}\,L_m]}{m+n},$$

where $L_k$ is brightness of the area, $L_n$ is brightness of adjacent areas which are perpendicular or parallel to the area, $L_m$ is brightness of the adjacent areas which are diagonal with the area, n is the number of the adjacent areas which are perpendicular or parallel to the area, and m is the number of the adjacent areas which are diagonal with the area; and
   comparing the value K with a predetermined value, wherein when the value K is greater than the predetermined value, it indicates that the brightness difference between the area and the adjacent areas exceeds a uniformity threshold, and when the value K is smaller than the predetermined value, it indicates that the brightness difference between the area and the adjacent areas is below the uniformity threshold.

2. The method of claim 1, wherein the panel is a liquid crystal display (LCD) panel.

3. The method of claim 1, wherein the panel is an LCD backlight panel.

4. The method of claim 1, wherein the panel is equally divided into a plurality of areas.

5. The method of claim 4, wherein the areas are arranged in a matrix.

6. The method of claim 5, wherein the measuring step is to measure brightness of all the areas at the same time.

7. The method of claim 5, further comprising dividing the areas into a plurality of blocks so that each block comprises plural areas.

8. The method of claim 7, wherein the measuring step is to measure brightness of all areas of at least one block at the same time.

9. The method of claim 5, wherein the measuring step is to measure brightness of the areas one by one.

10. The method of claim 9, wherein each area is a circular area.

11. The method of claim 10, wherein the step of measuring the brightness of the areas one by one comprises disposing a measuring instrument at a distance Z from the panel, so that the measuring instrument receives lights from the panel at a vision angle θ, that a radius r of each measured area is $r = z\tan(\theta/2)$ and that the number of the measured areas is $(L/2r)*(W/2r)$, where L is the length of the panel and W is the width of the panel.

12. The method of claim 11, wherein the distance Z is about 50 cm and the angle θ is about 1 degree.

13. The method of claim 1, wherein the predetermined value ranges from 0.013 to 0.017.

14. The method of claim 1, further comprising making a chart according to the value K calculated for each area.

15. The method of claim 14, further comprising marking in the chart areas with the value K which exceeds the predetermined value.

16. The method of claim 1, wherein the measuring step comprises utilizing a charge-coupled device (CCD) to measure the panel.

* * * * *